W. FILIPOWSKI.
FISHING DEVICE.
APPLICATION FILED MAY 6, 1911.
999,214.
Patented Aug. 1, 1911.
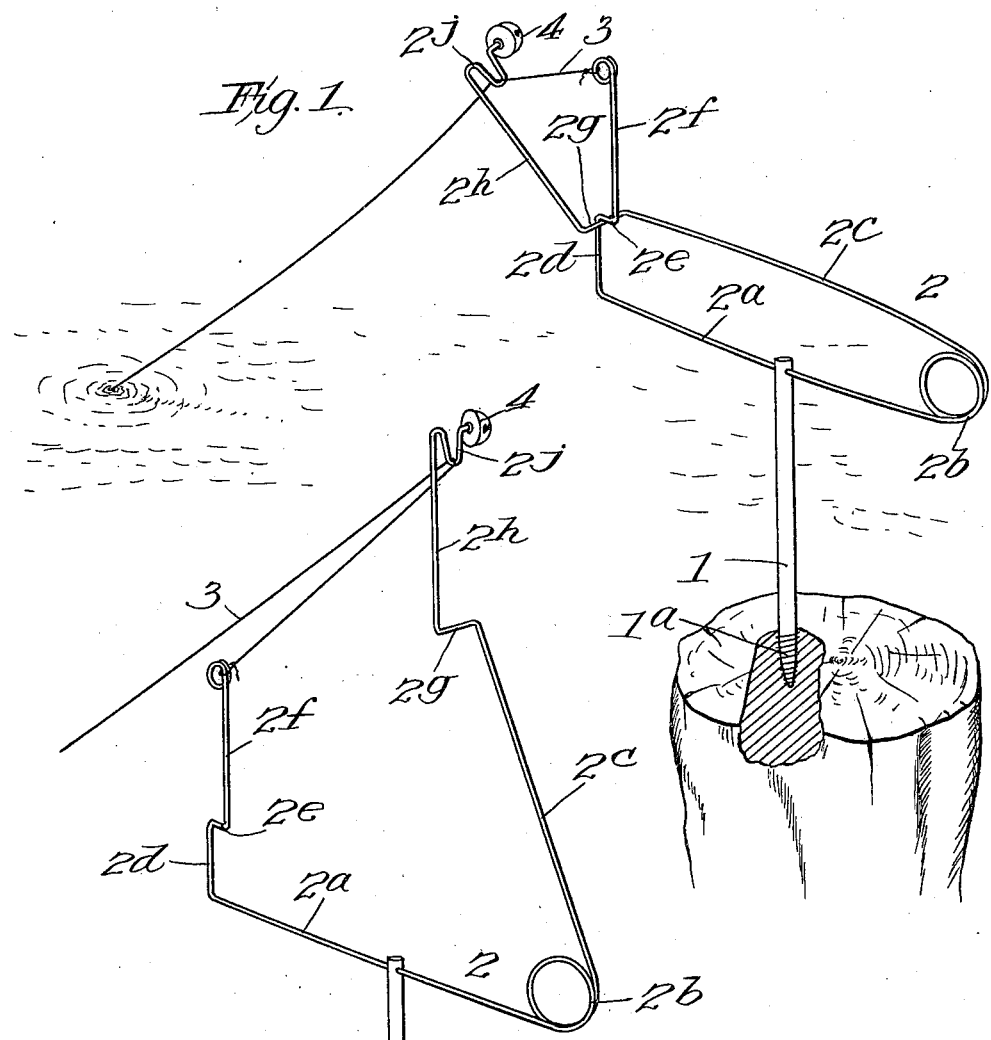

UNITED STATES PATENT OFFICE.

WLADYSLAW FILIPOWSKI, OF HAWTHORNE, ILLINOIS.

FISHING DEVICE.

999,214.

Specification of Letters Patent.

Patented Aug. 1, 1911.

Application filed May 6, 1911. Serial No. 625,507.

*To all whom it may concern:*

Be it known that I, WLADYSLAW FILIPOWSKI, a citizen of the United States, residing at Hawthorne, in the county of Cook and State of Illinois, have invented new and useful Improvements in Fishing Devices, of which the following is a specification, reference being had to the accompanying drawings, forming a part thereof.

The purpose of this device is to provide an apparatus for use in angling which shall automatically jerk the line when a fish bites, and at the same time give notice of the catch.

It consists of the features and elements of construction shown and described as indicated in the claims.

In the drawings:—Figure 1 is a perspective view of the device, showing the parts set in position preparatory to catching a fish. Fig. 2 is a similar view, showing the parts in released or operative position.

As illustrated, the device is designed to be set in the ground or in any conveniently located object, as the stump of a tree or plank near the bank or shore of the body of water in which the fishing is to be done, and for this purpose there is provided a comparatively rigid post or standard, 1, having at its lower end a screw tang, $1^a$, designed to facilitate the placing of the post. The device which is intended to operate the fish line, is shown as being constructed of a single piece of spring wire, 2, of which the cross arm, $2^a$, is rigidly secured to the post, 1, approximately at right angles thereto, near its upper end. At one end of the arm, $2^a$, the wire is wound in a single coil, $2^b$, which serves as a torsional spring fulcrum for the movable arm, $2^c$, so that this much of the device resembles the common safety pin, both in form and principle of operation.

At the opposite end the arm, $2^a$, has an upwardly bent portion, $2^d$, followed by a short horizontal jog, $2^e$, and a second vertically extending part, $2^f$, to the end of which the fishing line, 3, is tied. The free end of the movable arm, $2^c$, is also formed with a short horizontal jog, $2^g$, which, however, in the horizontal plane is directly transverse of the jog, $2^e$, of the other arm, and so located as to register with it when the parts are positioned as shown in Fig. 1; thus the portion, $2^e$, serves as a latch to hold the spring arm, $2^c$, in this position. From this jog the arm extends obliquely at, $2^h$, so as to bring its terminus beyond the extreme end of the portion, $2^f$, in the direction of the water, that is, in a direction away from the shore. This terminus of the oblique arm, $2^h$, has the form of a smooth hook, $2^j$, in which the line, 3, may lie, and is further provided with an alarm device in the form of a bell or rattle, 4, the operation of which is hereinafter described.

With the apparatus set as shown in Fig. 1, the line, 3, will lie slack in the water, but as soon as the fish begins to nibble, and in so doing draws the line taut, the cross arm, $2^a$, together with its upright portions, $2^d$ and $2^f$, is flexed sufficiently to disengage the portion, $2^e$, from the part, $2^g$, of the movable arm, thus unlatching the latter and allowing it to swing upward into the position illustrated in Fig. 2. Since this upward movement of the arm, $2^c$, is caused by the reaction of the spring coil, $2^b$, upon the release of the arm, such movement is comparatively sudden and violent, but not of great extent; it results therefore, in giving the line a quick jerk, calculated to securely hook the fish. At the same instant, by the movement and vibration of this spring arm, upon which it is carried, the alarm bell, 4, is sounded, informing the fisherman of the catch.

I claim:—

1. A fishing device, comprising a one-piece line holder and recoil-arm made of a spring rod, coiled intermediate its ends to form a spring joint from which the two members normally extend divergently, one of said members having its end portion upbent and terminating in a line attachment, located within the angle of normal divergence of the two members, the other member having a line lodgment situated at a greater distance from the spring joint than the line attachment on the first member, the upbent end portion of the first member having an offset toward the spring joint, forming a downwardly facing shoulder for engagement of the other member when the members are folded together for tensioning the spring joint.

2. A fishing device, comprising a one-piece line holder and recoil-arm made of a spring rod, coiled intermediate its ends to form a spring joint from which the two members normally extend divergently, one of said members having its end portion upbent and terminating in a line attachment, located within the angle of normal divergence of the two members, the other member having a line lodgment situated at a greater distance from the spring joint than the line attachment on the first member, the upbent end portion of the first member having an offset, the other member having an offset forming an upwardly facing shoulder, positioned for engaging the shoulder of the first member when the members are folded together for tensioning the spring joint.

3. A fishing device, comprising a one-piece line holder and recoil-arm made of a spring rod, coiled intermediate its ends to form a spring joint from which the two members normally extend divergently, one of said members having its end portion upbent and terminating in a line attachment, located within the angle of normal divergence of the two members, the other member having a line lodgment situated at a greater distance from the spring joint than the line attachment on the first member, the upbent end portion of the first member having an offset toward the spring joint, forming a downwardly facing shoulder for engagement of the other member when the members are folded together for tensioning the spring joint, and a stem, to the upper end of which the first of said members is rigidly secured.

In testimony whereof I have hereunto set my hand at Chicago, Illinois, this 2d day of May, 1911.

WLADYSLAW FILIPOWSKI.

Witnesses:
ENA M. MACINTOSH,
M. GERTRUDE ADY.

---

Copies of this patent may be obtained for five cents each, by addressing the "Commissioner of Patents, Washington, D. C."